United States Patent [19]

Katagiri et al.

[11] 4,317,508
[45] Mar. 2, 1982

[54] DISC BRAKE

[75] Inventors: Masayoshi Katagiri; Takashi Fujii, both of Toyota, Japan

[73] Assignees: Toyota Jidosha Kogyo Kabushiki Kaisha; Aisin Seiki Kabushiki Kaisha, both of Aichi, Japan

[21] Appl. No.: 119,380

[22] Filed: Feb. 7, 1980

[30] Foreign Application Priority Data

Feb. 24, 1979 [JP] Japan .................................. 54-21182

[51] Int. Cl.³ .......................................... F16D 65/847
[52] U.S. Cl. .................................. 188/218 A; 188/71.6
[58] Field of Search ............... 188/71.6, 218 A, 264 A

[56] References Cited

U.S. PATENT DOCUMENTS 4,005,768  2/1977  Bubnash et al. ................ 188/218 A Primary Examiner—Duane A. Reger
Attorney, Agent, or Firm—Stevens, Davis, Miller & Mosher

[57] ABSTRACT

A disc brake of ventilated disc rotor type wherein air is positively introduced into the air passages formed in the disc rotor. In the dust cover of this type disc brake an air introducing hole is formed. On the outside of the dust cover an air collector is disposed for positively collecting and introducing the air flowing in the vicinity of the dust cover. On the inside of the dust cover an air guide is disposed for guiding the air taken through the air introducing hole as far as the entrance of the air passages in the disc rotor.

18 Claims, 4 Drawing Figures

DISC BRAKE

FIELD OF THE INVENTION

This invention relates to a disc brake having a ventilated disc rotor, and more particularly to an improvement of cooling capability of the disc rotor.

BACKGROUND OF THE INVENTION

Because of the fundamental structure of the disc brake, which restrains and halts the rotation of the disc rotor by urging braking pads on a rotating disc rotor, a great deal of heat is inevitably produced between the braking pads and the disc rotor. And this frictional heat is gradually accumulated there to raise the temperature of the brake, which tends to shorten the life of the braking pads. Since the coefficient of friction of the braking pads (particularly in case of braking pads including organic materials) degrades, as is well known, in proportion to the rising temperature, it is important to prevent or diminish the temperature rising around the disc rotor and braking pads to stabilize the function of the disc brake.

Various propositions have been made for cooling the brake. A ventilated disc rotor wherein a number of air passages are formed within the disc rotor is one. The air passages in this case are formed in a space sandwiched by a pair of friction surfaces, on which braking pads are urged, from the central part thereof towards the outer periphery. In this type of disc rotor, the air in the air passages moves toward the outer periphery of the friction surfaces and expelled by the centrigual force produced from the rotation of the rotor, just like the impeller of a centrifugal fan. The disc rotor is cooled, in this instance, by the air flow passing through the air passages disposed in the friction surfaces.

This type of ventilated disc rotor is at present widely used and recognized for its effective cooling capability. However, it is not completely satisfactory. More efficient cooling capability of the disc brake is still required and wanted in many quarters. In fact, overheating of the brake is still liable to happen when the brake is frequently applied, because the car is not being driven very fast, thus the rotational speed of the disc rotor is slow, resulting in decelerating the air flow in the disc rotor, and degrading the cooling efficiency of the rotor. Further, to remodel the dust cover so that it is open in the car-driven direction, in pursuit of high cooling efficiency, brings a large volume of air into the brake system at the cost of inhaling undesirable water, mud, etc., mixed within the air. It spoils the inherent function of the dust cover.

SUMMARY OF THE INVENTION

It is a principal object of this invention to provide a disc brake of high cooling capability.

It is another object of this invention to provide an excellent disc brake which is high in cooling capability and well protected from ingress of water, mud, etc.

It is still another object of this invention to provide a disc brake highly enhanced in its cooling effect by means of introducing an air flow produced around the disc brake during the driving of a car into the air passages in a ventilated disc rotor for increasing the air volume passing therethrough.

It is further object of this invention to provide a disc brake wherein the air introduced from an air inlet disposed in the dust cover is led into an air passages formed in the disc rotor and at the same time the water and mud inhaled with the air is prevented from attaching to the friction surface of the disc rotor.

It is still further object of this invention to provide a disc brake capable of attaining the above-mentioned object, while being as simple as possible in structure and low in manufacturing cost.

In this invention, the air flowing outside the dust cover is introduced into the brake by virtue of an air collector which increases the air volume flowing through the air passages in the disc rotor and supplements the air flowing capability of the disc rotor. At the same time the invented disc brake prevents, while greatly enhancing the cooling capability on one hand, the inhaled water, mud, etc. from reaching the friction surface of the disc rotor, by means of an air guide which catches most of the water and mud on its air guiding inner surface, and exhaust the air from the air passages formed within the disc rotor. Thus inherent object of the dust cover itself is also fully attained while enhancing the cooling capability.

DETAILED DESCRIPTION OF THE PREFERRED EMBODIMENTS

With reference to the appended drawings preferred embodiments will be described hereunder.

Figure 1:
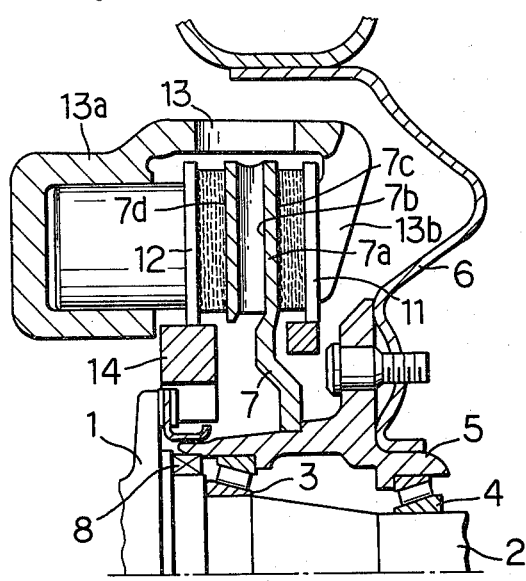
FIGS. 1 and 2 are respectively an axial sectional view of an embodiment of a disc brake of this invention taken at different planes.

Numeral 1 in FIG. 1 designates a knuckle which is attached, by way of a suspension means, to a chassis of a car. To a wheel shaft 2 secured to the knuckle 1 a hub 5 is, via bearings 3, 4 and a seal 8, attached, on which in turn a wheel disc 6 and a disc rotor 7 (hereinafter simply called a rotor) are fixed, both being integrally rotatable. In a friction plate portion 7a of the rotor 7 a number of air passages 7b, running from the central part to the outer periphery thereof, are formed. Inlets of those air passages 7b are positioned at a constant radius from the rotor axis and open directed toward the axis of the rotor 7.

On either surface of the friction plate portion 7a of this rotor 7 a pair of braking pads (hereinafter simply called pads) 11, 12 are placed and in a straddling manner over the pads and the friction plate portion 7a, a caliper 13 is disposed. The pads 11, 12 and the caliper 13 are retained movably in an axial direction of the rotor 7 by a retainer or stationary support member 14 secured to the knuckle 1. The caliper 13 is provided, on one side, with a cylinder 13a and, on the other side, a reaction portion 13b. It urges, when the cylinder 13a is applied hydraulic pressure, the pads 11, 12 onto friction surfaces 7c, 7d on the friction plate portion 7a of the rotor 7. An accompanying rotational torque, which is a torque imparted by the rotor 7 tending to bring the pads 11, 12 therewith, is received by the retainer 14 for halting the rotation of the rotor 7.

Figure 2:
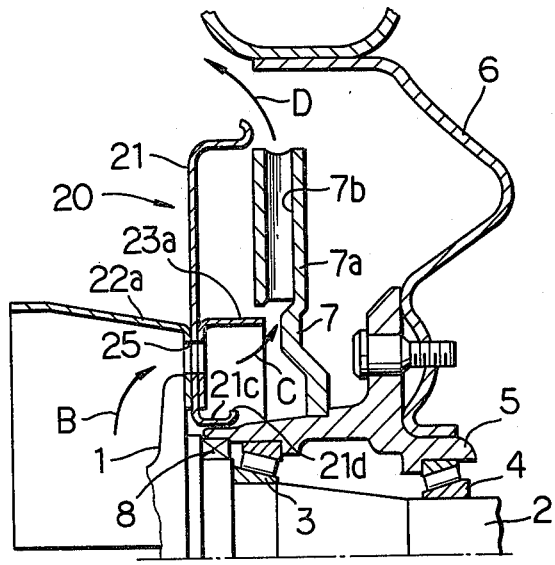
Figure 3:
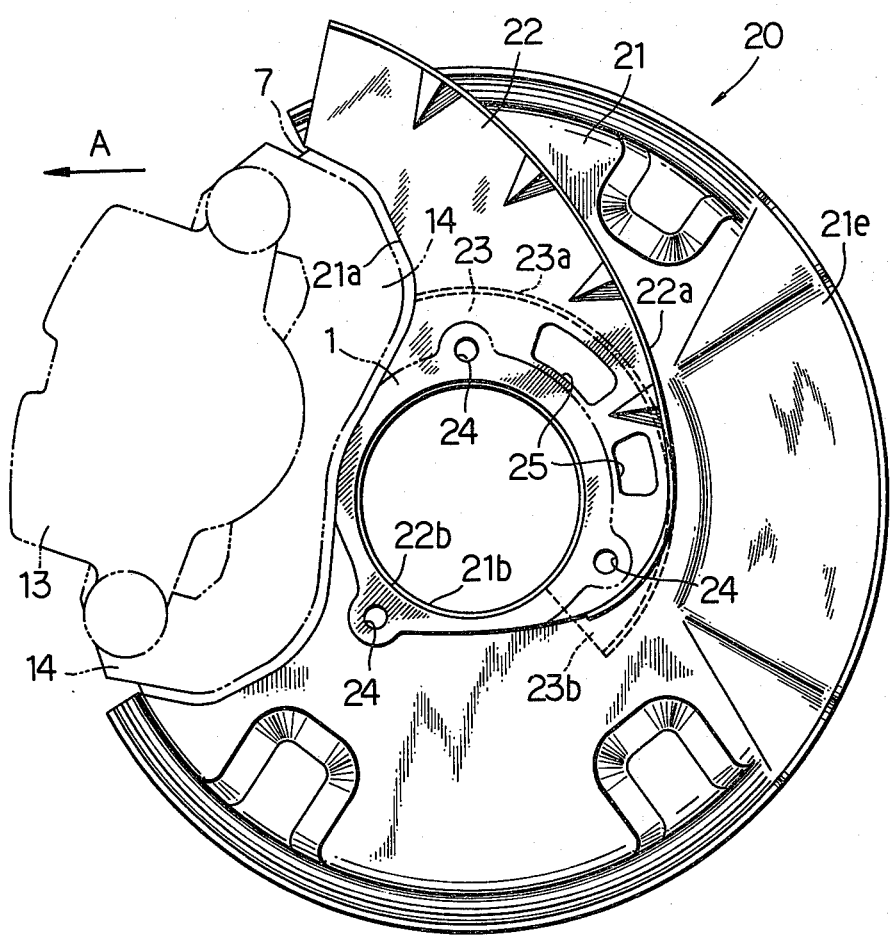
FIG. 3 is an elevational view of a dust cover employed in the embodiment shown in FIGS. 1 and 2.

The rotor 7 is covered, on one surface thereof, by the wheel disc 6 and, on the other surface as shown in FIGS. 2 and 3, by a unit of a dust cover assembly 20, which is composed of a dust cover 21, an air collecting plate or wall 22, and an air guiding plate or wall 23. The last two members are all plates of L-letter shape in section (members of angle type) and fixedly secured, as an unseparable or integral parts, on the dust cover 21 at each leg thereof by means of spot welding, rivetting or other suitable means.

The duct cover 21 is provided, in the outer portion thereof, with a recess 21a for receiving the retainer 14 thereinto, and in the central portion a through-bore 21b. Around the through-bore 21b the dust cover 21 is inwardly bent to form a cylindrical portion 21c having a flange portion 21d on the edge thereof, forming all together an outwardly facing annular gutter shape. And a part of the outer portion of the dust cover 21 is formed into a shape deviating from the friction surface of the rotor 7, which functions as an air exhaust opening 21e open toward the rear side of the car. The air collecting plate 22 is provided with a through-bore 22b, formed concentrically with the through-bore 21b of the dust cover 21, and an air collector portion 22a (one leg of an angle type member), rising approximately perpendicularly to the outer surface of the dust cover 21 and the latter is almost parallel at the tip portion thereof to the driving direction of the car shown with the arrow A, but almost perpendicular thereto at the root portion thereof, volutely approaching the central portion (axis portion). The air guiding plate 23 is of arcuate form embracing the cylindrical portion 21c of the dust cover 21 therein. On the outer edge thereof is an air guide portion 23a (one leg of an angle member), forming a part of a cylinder. The air guide portion 23a extends as far as exceeding a plane including the friction surface 7d of the rotor 7, reaching at its height almost the inlet (entrance) of the air passage 7b.

The dust cover assembly 20 is fastened to the knuckle 1 at three attaching holes 24 with a fastening bolt. Where the air collector portion 23a approaches the knuckle 1 an air introducing hole 25 is formed, which is divided into two inlet openings formed piercing through each of the air collecting plate 22, the dust cover 21, and the air guiding plate 23.

As the disc brake of this embodiment, the air flowing rearwards (rightwards in FIG. 3), when the car advances in the arrow A direction in FIG. 3, outside the dust cover assembly 20 is collected by the air collector portion 22a into the air introducing hole 25 as shown with the arrow B in FIG. 2, and then inside the dust cover 21. The introduced air is guided by the air guiding wall portion 23a into the air passages of the rotor 7 as shown with the arrow C.

The air is further flowed through the air passages 7b to finally be exhausted out of the disc brake as shown with the arrow D. As stated above the air flowing outside the dust cover assembly 20 is positively collected at the air collecting wall portion 23a for being delivered into the air passages 7b. It heightens the flow speed of the air in the air passages, contributing to the improvement of the cooling effect of the rotor 7.

It is inevitable even in this embodiment that some water and mud, which should be prevented by the dust cover 21, actually comes inside the dust cover 21 with the air, but the water and mud will not reach, since there are blocked by the air guide portion 23a, the friction surface 7d of the rotor 7. The major part of it is caught by the inner surface of the air guide portion 23a of arcuate form for being flowed down therealong to be finally dropped from an opening 23b formed in the lower portion of the air guide portion 23a, and the rest is exhausted through the air passages 7b in the rotor 7, being exhausted entirely harmlessly. The cylindrical portion 21c formed in the central part of the dust cover 21 and the flange portion 21d on the edge thereof function as a gutter for the water which flows along the surface of the dust cover assembly 20 into the interior of the dust cover 21, effectively preventing the water from reaching the seal 8 which protects the bearings 3.

The dust cover 21 of this embodiment is provided with an air exhaust opening 21e facing the rear of the car, which improves the airflow while preventing the ingress of water and mud. Thus the cooling of the friction surfaces 7c, 7d is very good, which improves the cooling capability of the brake system.

Figure 4:
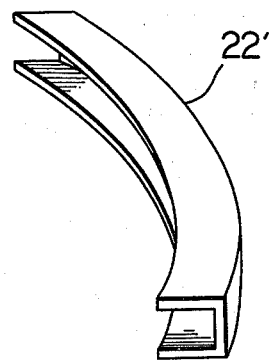
FIG. 4 is a perspective view of an air collector in another embodiment.

The above described embodiment is only for exemplifying the invention, by no means limiting the same. The air collecting plate 22, for example, may be altered from the L-letter shape one to the U-letter shape air collecting plate 22', a channel type, as shown in FIG. 4. In this type a flange of the same may be secured to the outside surface of the dust cover 21, the web portion thereof may function as the air collector portion and the other flange prevents the collected air from escaping. The air introducing hole, the air guide portion are also modifiable in shape. An air collector and/or an air guide may be formed by a part of a dust cover itself. Other variations and modifications are available of course without departing from the scope and spirit of this invention.

What is claimed is:

1. A disc brake comprising:
   a ventilated disc rotor having a plurality of air passages running between a pair of friction surfaces thereof from the central part to the outer periphery thereof;
   a pair of braking pads disposed on either side of said disc rotor;
   a mechanism for urging said pair of braking pads onto the friction surface on either side of said disc rotor;
   a stationary support member for supporting said braking pads;
   a dust cover for covering said disc rotor to protect said rotor from water and mud, said dust cover being provided with an air introducing hole positioned closer to the center of said disc rotor than to said friction surfaces of said disc rotor;
   an air collector disposed on the outer side of said dust cover and having a portion extending outwardly from said dust cover for collecting air flowing outside the dust cover to lead it to said air introducing hole; and
   an air guide disposed on the inner side of said dust cover for guiding the air coming from the air introducing hole as far as the plurality of entrances of said air passages in said disc rotor.

2. A disc brake as claimed in claim 1, wherein said air collector is made of an angle type member of L-letter shape in its section, and one leg of said angle type member is secured to the outside surface of said dust cover and the other leg of the same is said portion extending outwardly from said dust cover.

3. A disc brake as claimed in claim 2, wherein said other leg of the angle type member is of involute form, the radius from the axis of the disc rotor being progressively diminished from one end of the air collector to the other, and is secured to said dust cover in such a manner that the outermost end is almost parallel to the air flowing outside said dust cover and the innermost end is approximately perpendicular to the air flowing outside said dust cover, and said air introducing hole is an opening formed in said dust cover up stream in the airflow from said innermost end of said air collector.

4. A disc brake as claimed in claim 1, wherein said air collector is made of a channel type member having a pair of flanges and a web portion, one of said pair of flanges being secured to the outside surface of said dust cover, said web portion is said portion extending outwardly from said dust cover, and the other of said pair of flanges preventing the air collected from escaping.

5. A disc brake claimed in claim 1, wherein said air guide is made of an angle type member of L-letter shape in its section, and one leg of said angle type member is secured to the inside surface of said dust cover and the other leg of the same is rising from the inside surface of said dust cover almost perpendicularly thereto for guiding the air taken through said air introducing hole to said entrances of said air passages.

6. A disc brake claimed in claim 1, wherein an entrance of said air passages is open, at a position with a constant radius from the axis of said disc rotor, toward said axis, said air guide is made of an angle type member of arcuate form with a smaller radius than said radius, one leg of said angle type member being secured to the inside surface of said dust cover, and the other leg of the same extending, beyond a plane including the friction surface of said disc rotor, as far as the entrance of said air passage for guiding the air coming from said air introducing hole to said air passage and for preventing the water introduced with said air from reaching the friction surface of said disc rotor.

7. A disc brake claimed in claim 1, wherein said air collector and said air guide plate are both made of an angle type member, and three of said dust cover, and the two angle type members are integrally combined as an unseparable unity by means of securing one leg of each of the two angle type members respectively to the outside surface and the inside surface of said dust cover.

8. A disc brake claimed in claim 7, wherein said air introducing hole is an opening piercing through three of the dust cover and each leg of the two angle type members.

9. A disc brake claimed in claim 1, wherein said dust cover is provided, in the central part thereof, with an opening through which the wheel shaft pierces, an inwardly bent cylindrical portion surrounding said opening, and a flange extending from the edge of said bent cylindrical portion in an alienating direction from the wheel shaft, and said cylindrical portion, said flange, and said dust cover form together an outwardly directed annular groove like a gutter.

10. A disc brake comprising:
a ventilated disc rotor having a plurality of air passages running between a pair of friction surfaces thereof from the central part to the outer periphery thereof;
a pair of braking pads disposed on either side of said disc rotor;
a mechanism for urging said pair of braking pads onto a friction surface on either side of said disc rotor;
a stationary support member for supporting said braking pads;
a dust cover for covering a part of one side surface of said disc rotor where said disc rotor is not covered by said support member, said dust cover having an air introducing hole positioned closer to the center of said disc rotor than to said friction surfaces;
an air collecting plate extending perpendicularly outward from the outside surface of said dust cover to collect air flowing outside said dust cover and introduce the air into said air introducing hole; and
an air guiding plate secured to the inside surface of said dust cover for guiding the air introduced through said air introducing hole as far as the plurality of entrances of said air passage and preventing water introduced with said air from reaching the friction surfaces of said disc rotor.

11. A disc brake comprising:
a ventilated disc rotor having a pair of annular friction surfaces, said friction surfaces having a plurality of air passages running from the inner to the outer periphery of said friction surfaces;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole;
an air collector having an L-letter shape in cross-section, one leg of said L-letter shape is secured to the outside surface of said dust cover and the other leg of the same extends substantially perpendicular outward from said outside surface for collecting air flowing outside the dust cover to lead it to said air introducing hole; and
an air guide disposed onto the inner side of said dust cover for guiding the air coming from the air introducing hole to the entrances of said air passages in said disc rotor.

12. A disc brake as claimed in claim 11, wherein said air collector has an involute shape such that the radius from the axis of the disc rotor to said outwardly extending leg of said dust cover is progressively diminished from one end of said air collector to the other, and is secured to said dust cover in such a manner that the outermost end is almost parallel to the air flowing outside said dust cover and the innermost end is approximately perpendicular to the air flowing outside said dust cover, and said air introducing hole is an opening formed in said dust cover up stream in the air flow from said innermost end of said air collector.

13. A disc brake comprising:
a ventilated disc rotor having a pair of annular friction surfaces, said friction surfaces having a plurality of air passages running from the inner to outer periphery of said friction surfaces;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole;
a channel shaped air collector comprising a pair of flanges and a web portion, one of said flanges being secured to said outside surface of said dust cover, said web extending substantially perpendicular out from said dust cover, said air collector collects air flowing outside the dust cover to lead it to said air introducing hole; and an air guide disposed on the inner side of said dust cover for guiding the air coming from the air introducing hole as far as the entrances of said air passages in said disc rotor.

14. A disc brake comprising:
a ventilated disc rotor having a a pair of annular friction surfaces, said friction surfaces having a plurality of air passages running from the inner to the outer periphery of said friction surfaces;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole;
an air collector disposed on the outer side of said dust cover for collecting air flowing outside the dust cover to lead it to said air introducing hole; and
an air guide for guiding the air coming from the air introducing hole to the entrances of said air passages in said disc rotor, said air guide being L-shape in cross-section, one leg of said L-shape secured to the inside surface of said dust cover and the other leg of said L-shape extending substantially perpendicular outward from the inside surface of said dust cover.

15. A disc brake comprising:
a ventilated disc rotor having a pair of annular friction surfaces, said friction surfaces having a plurality of air passages running from the inner to the outer periphery of said friction surfaces, the entrances of said air passages are at a constant radius from the axis of said disc rotor;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole;
an air collector disposed on the outer side of said dust cover for collecting air flowing outside the dust cover to lead it to said air introducing hole; and
an air guide disposed on the inner side of said dust cover for guiding the air coming from the air introducing hole to the air passages entrances in said disc rotor.

16. A disc brake comprising:
a ventilated disc rotor having a pair of annular friction surfaces, said friction surfaces having a plurality of air passages running from the inner to the outer periphery of said friction surfaces;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole;
an air collector disposed on the outer side of said dust cover for collecting air flowing outside the dust cover to lead it to said air introducing hole;
an air guide disposed on the inner side of said dust cover for guiding the air coming from the air introducing hole as far as the entrances of said air passages in said disc rotor; and
said air collector and said air guide plate are both made of an angle type member, and said dust cover and said two angle type members are integrally connected by one leg of each of the two angle type members being secured to the dust cover, the air collector secured on the outside of the dust cover and the air guide secured to the inside surface of the dust cover.

17. A disc brake claimed in claim 16, wherein said air introducing hole is an opening piercing through the dust cover and each leg of the two angle type members.

18. A disc brake comprising:
a ventilated disc rotor having a pair of friction surfaces, a plurality of air passages running between said friction surfaces from the central part to the outer periphery of said disc rotor;
a pair of braking pads disposed on either side of said disc rotor;
a mechanism for urging said pair of braking pads onto the friction surface on either side of said disc rotor;
a stationary support member for supporting said braking pads;
a dust cover for covering said disc rotor to protect the same from water and mud, said dust cover having an air introducing hole, said dust cover comprising a central part having an opening for a wheel shaft to pierce, an inwardly bent cylindrical portion surrounding said opening, and a flange extending from the edge of said bent cylindrical portion in a direction away from said opening, and together said cylindrical portion, said flange, and said dust cover form an outwardly directed annular gutter-like groove;
an air collector disposed on the outer side of said dust cover for collecting air flowing outside the dust cover to lead it to said air introducing hole; and
an air guide disposed on the inner side of said dust cover for guiding the air coming from the air introducing hole as far as an entrance of said air passages in said disc rotor.

* * * * *